Dec. 8, 1931.   H. H. SEMMES   1,835,532
AIRFOIL
Filed Nov. 19, 1929
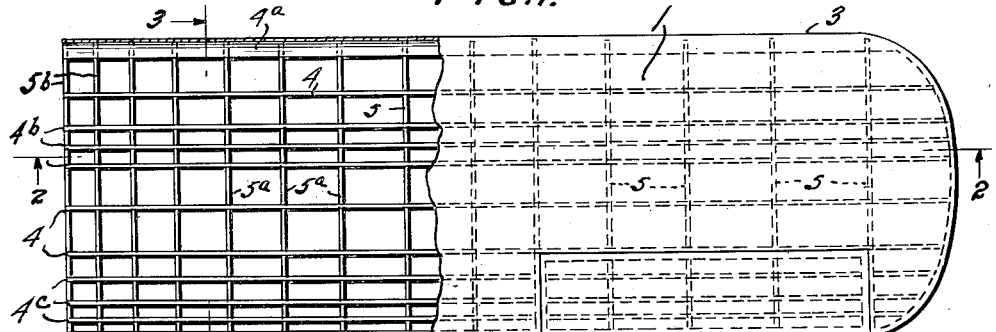
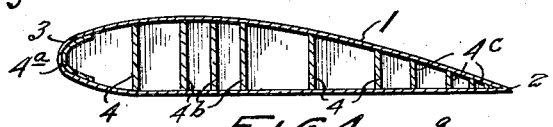
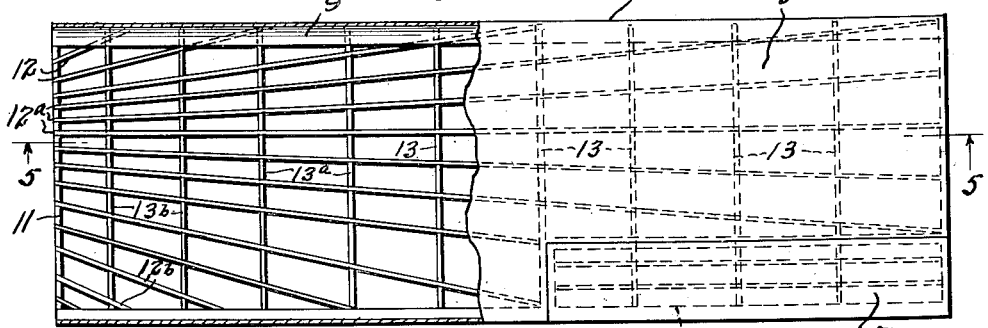
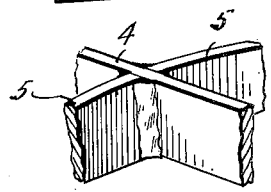
Inventor
HARRY H. SEMMES
By Semmes & Semmes
Attorneys Patented Dec. 8, 1931

1,835,532

UNITED STATES PATENT OFFICE

HARRY H. SEMMES, OF CHEVY CHASE, MARYLAND, ASSIGNOR TO BENDIX AVIATION CORPORATION, OF NEW YORK N. Y., A CORPORATION OF DELAWARE

AIRFOIL

Application filed November 19, 1929. Serial No. 408,375.

The invention relates to airplanes and more particularly has reference to an airfoil construction therefor which possesses great strength and rigidity.

This application is a continuation in part of an application Serial Number 372,156, filed June 19, 1929.

At present airfoils or airplane wings are constructed so as to support a load of from 12 to 15 times the weight of the airplane itself. Beyond these limits structural weight is added to such an extent that the airplane is impractical and strength must be sacrificed for weight.

As is well known dynamic loads are created by the actuation of the airplane control surfaces and at times these loads may well exceed the structural strength of the wings and cause them to fail. The amount of these dynamic loads are greatly influenced by the time factor within which the control surfaces of an airplane are operated. By arranging the control surfaces so that they may not be actuated quickly excessive strains upon the wings may be prevented. While this has been successfully accomplished, it is evident that the ease and the speed with which an airplane may be maneuvered into various positions is considerably lowered.

It is customary in the present practice to construct an airfoil of a plurality of spars and ribs, the former being positioned at definite and equal distances along the transverse axis or chord of the airfoil, while the latter are positioned at equal distances apart from each other along the longitudinal axis of the airfoil. While such structure has successfully furnished a strength sufficient to support a load, within the limits mentioned above, it may be observed that no attempts have been made to employ a considerable number of spars and ribs possessing relatively small cross sections and positioned in groups at the points or within the zones where the resultant of the load carried by the wing takes effect so as to increase the structural strength while at the same time reducing the weight of the airfoil.

It is also quite customary to form the spars and ribs, employed in an airfoil construction, of a plurality of members usually a beam or girder-like member having a web, and one or more flanges. Generally these members are formed separately and are secured to the web. It is apparent that such construction has the inherent defect that an unnecessary multiplicity of parts is required.

The major object of the invention is the design of an airfoil of light weight which possesses great strength and rigidity.

Another object of the invention is the construction of an airfoil provided with an integral frame.

Another object of the invention is the construction of an airfoil having an integral frame, the longitudinal and transverse members of which are grouped in close proximity to each other at the points or within the zone of the resultant load carried by the airfoil.

Yet another object of the invention is the design of an airfoil having an integral structure which is of fan-like shape.

A further object of the invention is the devising of an airfoil construction employing a plurality of spars arranged in a fan-like shape which are employed in conjunction with ribs arranged at varying distances apart from each other.

Still a further object of the invention is the devising of an airfoil construction comprising an integral frame which may be employed with an airfoil having a longitudinal outline tapered as to thickness, or a tapered planiform, or a combination of these two.

Yet a further object of the invention is the devising of an airfoil construction having an integral frame which is of simple design permitting ease of fabrication and of inexpensive construction.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The present invention deals with airplanes and consists in the construction of an airfoil therefor which is an integral structure. One method of practically effecting the concept of this invention is to provide a plurality of spars positioned at varying distances from each other along the transverse axis of the airfoil and a plurality of ribs positioned at varying distances from each other along the longitudinal axis of the airfoil. The invention also comprehends the grouping of these members at the points and within the zone of the resultant of the force or load acting upon the airfoil during flight.

In order to make my invention more clearly understood, I have shown in the accompanying drawings, means for carrying the same into practical effect without limiting the improvements in their useful applications to the particular constructions, which for the purpose of explanation, have been made the subject of illustration.

In the drawings:

Figure 1 is a plan view of an airfoil, with a part of the wing surfacing material removed, constructed in accordance with my invention.

Figure 2 is a cross sectional elevation of the airfoil shown in Figure 1 and is taken along the line 2—2.

Figure 3 represents a cross sectional elevation taken along the line 3—3 of Figure 1.

Figure 4 represents a plan view of a modified form of wing construction.

Figure 5 is a view along the line 5—5 of Figure 4.

Figure 6 is a view similar to Figure 5 but showing an airfoil having a longitudinal outline tapered as to thickness.

Figure 7 is a pictorial representation showing the manner of securing the ribs to the spars.

In the drawings similar reference numerals designate like parts through the different views. There is shown in Figure 1 a semi-span of an airplane wing generally designated as 1, and provided with an aileron 2, Suitable wing surfacing material 3 for the wing is also shown. Associated with the wing are spars 4 and ribs 5. It should be observed that the spar 4a adjacent to the leading edge of the airfoil is shaped so as to conform to the airfoil contour in order to support the nose surface thereof. If it is desired a similar construction may be employed along the trailing edge of the wing.

From an inspection of the drawings it may be noted that the wing spars are positioned parallel to the longitudinal axis of the airfoil and are so arranged that the distances between the spars vary with respect to one another. Thus the spars forward of the longitudinal center line of the airfoil are grouped so that they are in close proximity to each other as at 4b. Likewise it may be observed that the spars adjacent to the trailing edge of the airfoil, as at 4c, are also grouped so as to be in close proximity to each other.

The purpose of the above arrangement is at once apparent when it is considered that in good airfoil design the center of pressure along the chord of the airfoil section occurs at a point forward of the longitudinal center line of the airfoil. As is well known the location of the center of pressure of an airfoil varies for each angle of attack. Usually for an increase in an angle of attack the center of pressure moves forwardly or towards the leading edge of the wing. Hence it may be seen that the resultant load along the chord of an airfoil section occurs forward of the longitudinal center line of the airfoil and its position, for different angles of attack, moves back and forth within a specified zone. Thus the spars 4b are adapted to be positioned with the zone of the travel of the center of pressure for minimum and maximum angles of attack. By this construction it is apparent that the portion of the airfoil subject to the greatest stress due to the resultant of the load carried by the wing will be materially strengthened to take care of it.

Due to the cutout or cut-away portion of a wing for the purpose of positioning an aileron or control surface, the trailing edge of the wing needs special bracing. In order to provide for this and to furnish a strong structure along this portion, the spars 4c are placed in close proximity to each other.

An arrangement similar to that described in connection with the spars 4 is also employed for the ribs 5 associated with the wing. The stresses occurring along the span of the wing or its longitudinal axis, due to the total lift load, decreases for small and medium angles of attack from the portion of the semi-span adjacent to the fuselage outwardly to the wing tip. For large angles of attack, however, there is a slight increase in this load near the tip portion of the wing. As the load upon the wing increases the lateral center of pressure, or the lateral position of the resultant wing load, moves outwardly from the fuselage towards the wing tip. In good airfoil design it is important that the lateral center of pressure be as close to the fuselage of the airplane as possible. In order to provide for these conditions it is to be observed that the ribs 5 are positioned perpendicular to the longitudinal axis of the airfoil and are arranged along this axis so that the distances between the ribs vary. Moreover, it should be noted that the ribs near the fuselage, within the zone of the lateral center of pressure travel, are grouped in close proximity to each other as shown at 5a.

As in a great many instances the semi-span of an airfoil is a cantilever in effect, the ribs 5b adjacent to the inner end of the semi-span are also grouped in close proximity to each other. By this construction suitable support of the airfoil upon the fuselage of the plane is permitted. It will be observed that the foregoing construction is equally applicable for mounting the wings upon a monoplane, biplane, or triplane and upon planes where the wing or wings pass over or below the fuselage. While only a semi-span of an airplane wing has been shown, it will be well understood that the design here disclosed may be readily incorporated with an airfoil having its span undivided.

It is to be understood that the grouping of the wing spars shown at 4b and the grouping of the ribs shown at 5a may be varied according to the particular airfoils vary for different airfoil sections and also for the length of the span.

The construction here shown and described is equally applicable to wings having untapered outlines or those having outlines tapered as to thickness, are shown in Figure 2, or to planiform, or a combination of these two shapes.

The airfoil is intended to be constructed of metallic material, the ribs and spars being of thin cross section, while the surfacing material is of the sheet type. It is desired to employ metal which may be readily welded or fused. In such construction the spars 4 are of one piece and extend for substantially the full length of the airfoil shown in Figure 1, while the ribs 5 are formed of a plurality of separate sections, the length of which correspond to the different distances between the spars. In such a construction the sections of the ribs 5 are welded or fused to the one piece spars as shown in Figure 7.

The sheet metal surfacing material may be supported upon the ribs and spars in any conventional manner and may be welded or fused thereto. If it is desired corrugated sheet metal may be employed, with the corrugations so arranged that they may be crimped to the spars of the wing. Likewise if it is desired flanges may be positioned upon the spars and the ribs so as to support the surfacing material and give greater area for fusing the sheet metal thereto. In the event that a fabric wing covering is employed, the advantages of this latter construction are at once apparent.

Should it be found desirable to use metal which is difficult to weld such as aluminum or its alloys the airfoil skin may be secured to the ribs and spars by soldering, by rivets, or by other suitable fastenings. The ribs may be connected to the spars in a similar manner.

It will be well appreciated that wooden spars and beams may be employed in the construction here shown without departing from the spirit of the invention. Such spars and ribs may be formed of plywood or in any other convenient manner and they may be secured to each other by means of glue, small nails, or fittings, or any combination of these desired.

Attention is called to the fact that the spars and ribs present a relatively thin cross section in their transverse direction. This feature is disclosed in Figure 7. By such an expedient the weight of each spar and each rib is materially reduced and by employing a comparatively great number of these members and grouping them at points where the greatest stress occurs, an airfoil capable of withstanding excessive loads is provided. Although there is a comparatively great number of members used in this construction, due to the small weight of each one of them, it will be appreciated that the airfoil is well within the limits of the allowed structural weight for practical purposes.

It will be observed that the framework of spars and ribs are tied together by reason of the latter being secured to the former and an integral supporting framework for the airfoil is formed. Should any member be stressed, a portion of its load is transmitted to every part of the airfoil and the other members carry a part of it. Moreover, it may be appreciated that by the grouping given to the spars and ribs the strongest portion of the airfoil is located so as to carry the resultant load. By such a construction every member has a strengthening effect upon the other members of the airfoil.

There is shown in Figure 4 a modification of the invention disclosed in Figures 1, 2, and 3. Disclosed in this figure is a semi-span of an airplane wing generally designated as 6, having an aileron 7, and surfacing material 8. A spar 9 is shown running substantially the full length of the airfoil and parallel to the leading edge thereof. The spar 9 may be shaped so as to conform to the contour of the airfoil and support the surfacing material adjacent to the leading edge. If desired a spar 10 similar to spar 9 may be positioned upon the trailing edge of the airfoil.

Extending from the inner end base, or root 11 of the semi-span are a plurality of spars 12. It should be noted that the spars 12 extend outwardly from the base or root portion 11 and are of unequal length. Moreover, the spars are so arranged as to form a substantially fan-like structure. The outer ends of the spars are secured to the leading and trailing edges, the tip, and the ribs of the airfoil, while the inner ends of the spars are secured to the root portion 11 of the fan.

Spars 12 are so arranged that their inner ends, which are connected to the base portion 11, are at varying distances from each other. This construction allows the spars to be grouped in close proximity to each other within the zone of center of pressure travel as indicated at 12a. Likewise such construction permits the trailing edge, weakened by the cutout portion for the aileron, to be suitably supported and strengthened by the spars as shown at 12b.

An arrangement of the ribs 13, similar to the arrangement shown in Figure 1 is also employed. Thus the ribs 13 are spaced along the longitudinal axis of the airfoil so that their distances from each other vary. As it has been previously pointed out such an arrangement allows the ribs 13a, adjacent to the path of the lateral center pressure travel to be grouped in close proximity to each other thus adding strengthening qualities to the airfoil along the lateral position of the resultant lift load. Moreover, a grouping of the ribs may be employed close to the root portion 11 as shown by the ribs 13b. By this structural expedient the semi-span may be adequately supported from the fuselage of an airplane.

While only a semi wing span has been shown in the drawings, it will be well understood that such construction may be equally well employed with airplanes having a continuous wing or wings which passes either over or under the fuselage. In such an event a fan structure similar to that shown in Figure 4 could be placed upon the other or left side of the wing, and would have a common origin with the fan section shown. To accomplish this the spars forming the fan-like structure on the left side of the span could be connected to the base portion 11 or a second base portion could be provided if desired.

The construction shown in Figure 4 is disclosed in connection with a wing having an untapered outline and planiform and also in connection with a wing having a longitudinal outline tapered as to thickness. It is obvious, however, that the construction just described is equally applicable to an airfoil having a longitudinal outline tapered as to thickness and a tapered planiform.

As in the case of the first embodiment of the invention, the wing disclosed in Figures 5, 6, and 7 has its spars and ribs formed of metallic material having a relatively thin transverse cross section. Also sheet metal surfacing material may be employed with the airfoil. The ribs 13 are formed of a plurality of sections and are welded or otherwise secured between the spars in a manner similar to that previously described. Likewise it may be appreciated that this form of the invention may be equally well constructed of wood. In either instance fabric wing surfacing material may be employed if desired.

It is apparent that in the fan-like structure by providing a considerable number of spars and ribs having a thin cross section the advantages of a comparatively light airfoil is obtained. Moreover it is evident that the fan-like construction also provides an integral frame, any member of which upon being stressed will transmit a portion of its load to the other members of the airfoil. Similarly the advantages obtained by grouping the spars and the ribs within the zone of travel of the center pressure of the wing is present in the fan-shaped design.

While I have shown and described a wing having an elliptical tip and wing having a square tip, it is to be understood that other designs of wing tips, such for example, as a tip having a negative rake and a tip having a positive rake will fall within the scope of the invention. Likewise it is to be understood that the invention comprehends the use of any airfoil section, as for example, a section having a flat bottom chord, a double cambered section, a section having its under surface entirely concave, a combination of a concave and a convex section or any combination of these.

It is desirable to have means accessible to the interior of an airfoil so that the ribs and spars may be frequently inspected. In the event that sheet metal surfacing material is employed and this feature is desired in connection with the wing it is obvious that a portion of the upper surfacing material of the airfoil may be formed of sheet metal and the remainder of fabric.

The features of the airfoil construction will be appreciated from the foregoing description. It may be seen in both embodiments of the invention that an airfoil having an integral supporting frame formed of a comparatively great number of spars and ribs of thin cross section has been designed. Moreover, by grouping the spars and ribs at points within the zone where the greatest load upon an airfoil occurs, an exceptional strong or rigid construction has been provided. Likewise it is apparent that all the members of the airfoil resist loads or stress upon any particular member and all of the members act as bracing members for each other. Finally it may be seen that an airfoil of simple construction, comparatively small weight, and inexpensive fabrication has been devised.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An airplane wing having a plurality of spars, each of said spars being of one-piece continuous construction, said spars being arranged along the transverse wing axis at varying distances from each other, and a plurality of ribs for the wing, each of said ribs being formed of a plurality of sections of material adapted to be secured between two adjacent spars so as to be formed in a continuous line across the wing said ribs being positioned along the longitudinal axis of the wing at varying distances from each other.

2. An airplane wing having a plurality of spars, each of said spars being of one-piece continuous construction, said spars being arranged along the transverse axis of said wing at varying distances from each other and grouped in relative close proximity to each other near the trailing edge of said wing, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other.

3. An airplane wing having a plurality of spars, each of said spars being of one-piece continuous construction, said spars being arranged along the transverse wing axis at varying distances from each other, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other, the ribs near the portion of the wing adapted to be secured to a fuselage being grouped in relative close proximity to each other.

4. An airplane wing having a plurality of spars positioned substantially parallel to the longitudinal axis of the wing, said spars being arranged along the transverse axis of the wing at varying distances from each other, the spars nearest the trailing edge of the wing being grouped in close proximity to each other so that the distances betwen any two adjacent spars in the group is less than the distance between any two adjacent spars in other portions of the wing.

5. An airplane wing having a plurality of spars positioned substantially parallel to the longitudinal axis of the wing, said spars being arranged along the transverse wing axis at varying distances from each other, the spars nearest the trailing edge of the wing and adjacent a control surface associated with the wing being grouped in close proximity to each other so that the distance between any two adjacent spars in the group is less than the distance between any two adjacent spars positioned along the other portions of said wing.

6. An airplane wing having a plurality of spars, each of said spars being of one-piece continuous construction, said spars being arranged along the transverse axis of said wing at varying distances from each other, and grouped in relative close proximity to each other near the trailing edge, and also within the zone of the center of pressure travel along the wing chord, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other.

7. An airplane wing having a plurality of spars, each of said spars being of one-piece continuous construction, said spars being arranged along the transverse wing axis at varying distances from each other, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other, the ribs near the portion of said wing adapted to be secured to a fuselage and the ribs within the zone of the lateral center of pressure travel being grouped in relative close proximity to each other.

8. An airplane wing having a plurality of spars, each of said spars being of one-piece continuous construction, said spars being arranged along the transverse axis of said wing at varying distances from each other, and grouped in relative close proximity to each other near the trailing edge, and also within the zone of the center of pressure travel along the wing chord, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other, the ribs near the portion of said wing adapted to be secured to a fuselage and the ribs within the zone of the lateral center of pressure travel being grouped in relative close proximity to each other.

In testimony whereof I affix my signature.

HARRY H. SEMMES.